(12) United States Patent
Lee

(10) Patent No.: US 11,645,996 B2
(45) Date of Patent: May 9, 2023

(54) DISPLAY CONTROL CIRCUIT AND LIQUID CRYSTAL ON SILICON PANEL

(71) Applicant: Advanced Silicon Display Optoelectronics Corporation Ltd., Shenzhen (CN)

(72) Inventor: Lan Lee, Palo Alto, CA (US)

(73) Assignee: Advanced Silicon Display Optoelectronics Corporation Ltd., Shenzhen (CN)

( * ) Notice: Subject to any disclaimer, the term of this patent is extended or adjusted under 35 U.S.C. 154(b) by 0 days.

(21) Appl. No.: 17/577,780

(22) Filed: Jan. 18, 2022

(65) Prior Publication Data
US 2022/0254315 A1      Aug. 11, 2022

(30) Foreign Application Priority Data
Feb. 9, 2021   (CN) .......................... 202110180424.0

(51) Int. Cl.
*G09G 3/36*    (2006.01)
*G02F 1/1362*  (2006.01)

(52) U.S. Cl.
CPC ..... *G09G 3/3696* (2013.01); *G02F 1/136277* (2013.01); *G09G 2310/0286* (2013.01); *G09G 2310/0291* (2013.01)

(58) Field of Classification Search
CPC ......... G09G 3/3696; G09G 2310/0286; G09G 2310/0291; G02F 1/136277
See application file for complete search history.

(56) References Cited

U.S. PATENT DOCUMENTS

| | | | |
|---|---|---|---|
| 10,777,153 B1* | 9/2020 | Li ......................... | G09G 3/3696 |
| 2008/0062158 A1* | 3/2008 | Willis .................. | G09G 3/3622 |
| | | | 345/204 |
| 2008/0129911 A1* | 6/2008 | Huang .............. | G02F 1/136209 |
| | | | 257/E27.113 |
| 2013/0250219 A1* | 9/2013 | Tsai .................... | G02F 1/13452 |
| | | | 257/E33.012 |
| 2019/0361306 A1* | 11/2019 | Kim .................... | G02F 1/13624 |

FOREIGN PATENT DOCUMENTS

CN        108519690 B   * 11/2020   ............... B09B 3/00

* cited by examiner

*Primary Examiner* — Kenneth B Lee, Jr.
(74) *Attorney, Agent, or Firm* — ScienBiziP, P.C.

(57) ABSTRACT

A display control circuit applies to a LCoS panel including pixel units and a substrate. The display control circuit includes a pixel memory array circuit and a driving circuit. The pixel memory array circuit includes pixel memory units. A projection of the pixel memory array circuit on the substrate is in a projection of the pixel units on the substrate. The driving circuit includes a row driving circuit and a column driving circuit. A projection of the driving circuit on the substrate is outside the projection of the pixel units on the substrate. The driving circuit provides a modulation signal and pixel data. The pixel memory array circuit modulates the pixel data by the modulation signal to provide a pixel display voltage to each of the pixel units.

14 Claims, 6 Drawing Sheets

//DISPLAY CONTROL CIRCUIT AND LIQUID CRYSTAL ON SILICON PANEL

TECHNICAL FIELD

The present disclosure generally relates to display technology, particularly relates to a display control circuit and a liquid crystal on silicon panel.

BACKGROUND

Liquid crystal on silicon (LCoS) is a reflective projection device which controls liquid crystals to rotate by semiconductor silicon crystal technology to control phase distribution of an incident light to modulate images. Compared with a traditional display structure, the LCoS has characteristics of high light utilization efficiency, small volume, fast opening rate, and mature manufacturing technology, which can easily achieve high resolution and full color performance. Such characteristics give the LCoS great advantages in a display application.

A display panel includes the LCoS, a pixel driving circuit, and a control circuit. The display panel defines a pixel area including a plurality of pixel units. The LCoS includes a complementary metal oxide semiconductor (CMOS) array on a silicon substrate. The CMOS array, the pixel driving circuit, and the control circuit are in the pixel area and correspond to the pixel units, which results in large size of the pixel unit and the display panel, and further results in a low output of the display panel of a single wafer.

SUMMARY

The present disclosure is mainly for providing a display control circuit and a liquid crystal on silicon panel to reduce a size of pixels and improve an output of the liquid crystal on silicon panel of a single wafer.

One aspect of the present disclosure provides a display control circuit applied to a display panel. The display panel includes a plurality of pixel units and a substrate. The display control circuit includes a pixel memory array circuit and a driving circuit. The pixel memory array circuit includes a plurality of pixel memory units, wherein each pixel memory unit corresponds to one pixel unit. A projection of the pixel memory array circuit on the substrate is in a projection of the plurality of pixel units on the substrate. The driving circuit includes at least one row driving circuit and at least one column driving circuit, the driving circuit being electrically connected to the pixel memory array circuit. A projection of the driving circuit on the substrate is outside the projection of the plurality of pixel units on the substrate. The driving circuit is configured to provide modulation signals and pixel data. The pixel memory array circuit is configured to modulate the pixel data by the modulation signals to provide pixel display voltages to the plurality of pixel units.

In at least one embodiment, the plurality of pixel units include a display pixel area and an alignment pixel area surrounding the display pixel area. The pixel memory array circuit is configured to provide the pixel display voltage to each pixel unit in the display pixel area and provide a preset pixel voltage to each pixel unit in the alignment pixel area.

In at least one embodiment, each column driving circuit includes a peripheral circuit, a buffer, and a column driver. The peripheral circuit is at least configured to provide the pixel data. A column decoder is for accessing a column addressing signal. The buffer is electrically connected to both the column decoder and the peripheral circuit, the buffer is configured to cache the pixel data and the column addressing signal. The column driver is electrically connected to both the buffer and the pixel memory array circuit, and the column driver is configured to obtain the pixel data from the buffer.

In at least one embodiment, the column driver includes a low-voltage column driver, a high-voltage column driver, and a boost circuit electrically connected to both the low-voltage column driver and the high-voltage column driver. The low-voltage column driver is configured for driving low-voltage pixel data from the buffer for pixels. The high-voltage column driver is configured for driving high-voltage pixel data and outputting the high-voltage pixel data to the pixel memory array circuit for the pixels. The boost circuit is configured to boost and convert the low-voltage pixel data into the high-voltage pixel data to provide the high-voltage pixel data to the high-voltage column driver.

In at least one embodiment, the column driving circuit further includes a sense amplifier, a shifter, and an ITO voltage circuit. The sense amplifier is electrically connected to the column driver for amplifying the pixel data. The shifter is electrically connected to both the sense amplifier and the buffer. The shifter is configured for shifting and outputting the pixel data amplified to the pixel memory array circuit. The ITO voltage circuit is electrically connected to both the buffer and the pixel memory array circuit, and is configured to provide an ITO voltage for converting electrical polarity of the pixel data.

In at least one embodiment, the plurality of pixel units form at least two sub-pixel arrays. The display control circuit includes at least two column drivers, each column driver corresponds to one sub-pixel array, each of the plurality of pixel memory units and one column driver corresponding to a same sub-pixel array are electrically connected but isolated from other circuits.

In at least one embodiment, each row driving circuit includes a row decoder and a row driver electrically connected to both the row decoder and the pixel memory array circuit. The row decoder is for accessing a row addressing signal. The row driver is configured to control the pixel memory array circuit to read and write the pixel data according to the row addressing signal.

In at least one embodiment, the plurality of pixel units form at least two sub-pixel arrays. The display control circuit includes at least two row drivers, each row driver corresponds to one sub-pixel array. Each of the plurality of pixel memory units and one row driver corresponding to a same sub-pixel array are electrically connected but isolated from other circuits.

In at least one embodiment, the plurality of pixel units form M*N sub-pixel arrays. The driving circuit includes M*N column drivers and M*N row drivers. Each of the M*N column drivers corresponds to one of the M*N sub-pixel arrays, each of the M*N row drivers corresponds to one of the M*N sub-pixel arrays; each of the plurality of pixel memory units and one of the M*N column drivers corresponding to a same sub-pixel array are electrically connected by a wire of the one of the M*N column drivers, but isolated from other circuits. Wires of the M*N column drivers are electrically insulated from each other, each of the plurality of pixel memory units and one of the M*N row drivers corresponding to a same sub-pixel array are isolated and electrically connected. Wires of the M*N row drivers are electrically insulated from each other. M is a natural number greater than 1, and N is a natural number greater than 1.

In at least one embodiment, the driving circuit reads and writes the plurality of pixel memory units corresponding to the M*N sub-pixel arrays simultaneously.

In at least one embodiment, a word line in each row of the pixel memory array circuit is divided into a plurality of parts unconnected to each other, and/or a bit line in each column of the pixel memory array circuit is divided into a plurality of portions unconnected to each other.

In at least one embodiment, a projection of the at least one row driving circuit on the substrate and a projection of the at least one column driving circuit on the substrate are at a periphery of the projection of the plurality of pixel units on the substrate.

Another aspect of the present disclosure provides a LCoS panel including a CMOS substrate, a liquid crystal layer, a conductive glass film, and a cover plate stacked in sequence, the CMOS substrate is integrated with the display control circuit according to any embodiment above.

A beneficial effect of the present disclosure is that the projection of the driving circuit of the pixel units on the substrate is outside the projection of the pixel units on the substrate, only the pixel memory array circuit is within the projection of the pixel units on the substrate of the display panel, so that only one pixel memory unit is in each pixel unit. No additional control unit occupies the pixel unit, which can reduce a volume of the driving circuit in the pixel area, reduce the area of the pixel units, reduce a size of the display panel, and improve an output of the display panel of a single wafer or improve a resolution power of the display panel made from wafers with a same size.

BRIEF DESCRIPTION OF DRAWINGS

In order to more clearly explain embodiments of the present disclosure or the prior art, the following will briefly introduce drawings of the embodiments. The drawings described below only show structures in some embodiments of the present disclosure. One skilled in the art can obtain other drawings according to the drawings described below without creative labor.

DETAILED DESCRIPTION

The following will describe embodiments of the present disclosure clearly and completely in combination with the drawings described above. The embodiments described are only part of the embodiments of the present disclosure, not all the embodiments of the present disclosure. Based on the embodiments described, other embodiments obtained by one skilled in the art without making creative labor fall within a protection scope of the present disclosure.

The terms "first" and "second" in the present disclosure are only used for descriptive purposes, cannot be understood as indicating or implying importance, and cannot be understood as indicating or implying numbers of indicated technical features either. In descriptions of the present disclosure, "multiple" means at least two or more, unless expressly and specifically defined otherwise. In addition, the terms "include" and "have" and any deformation thereof are intended to cover nonexclusive inclusion. For example, a process, a method, a system, a product, or an equipment including a series of steps or units is not limited to the steps or units listed, but optionally also includes steps or units not listed, or optionally includes other steps or units inherent to the process, the method, product, or the equipment.

Figure 1:
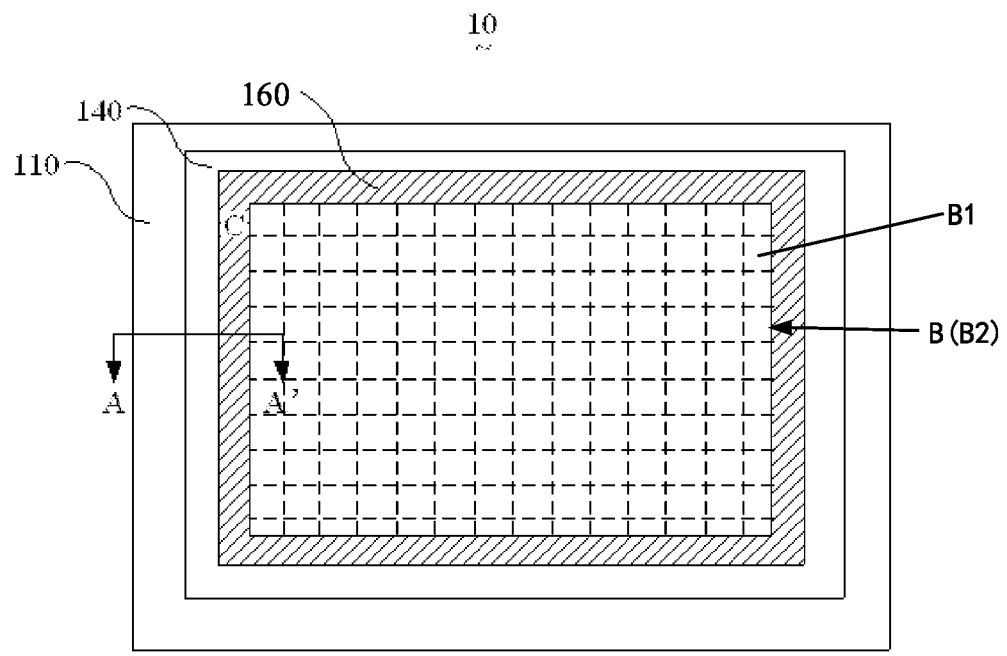
FIG. 1 is a planar view of a LCoS panel in an embodiment of the present disclosure.
Figure 2:
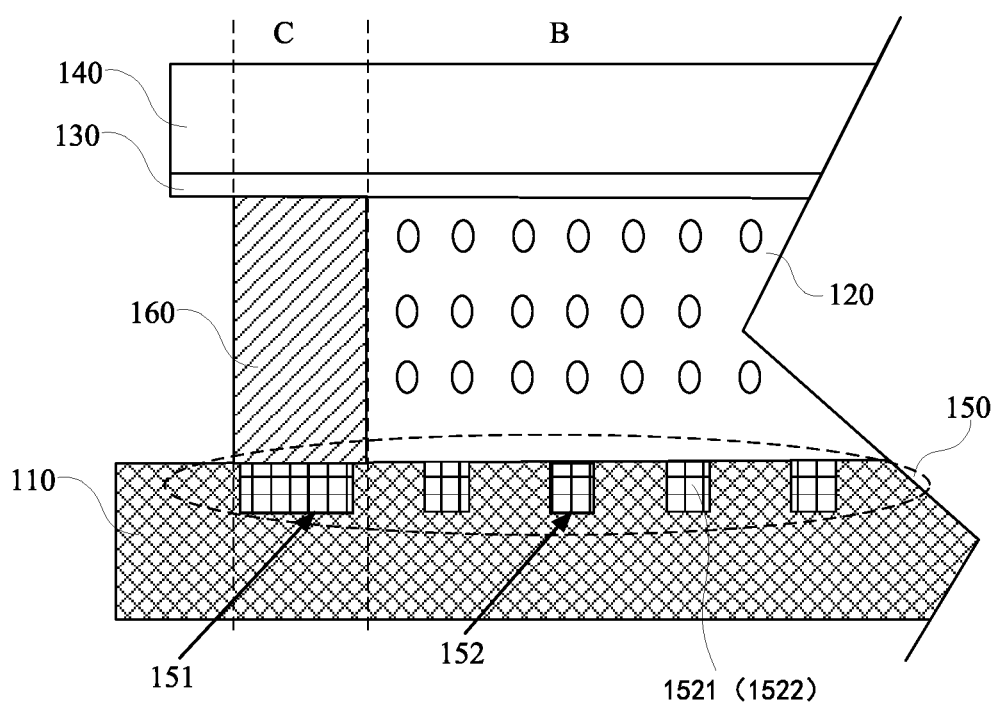
FIG. 2 is a cross-sectional view along line A-A' of FIG. 1.

The present disclosure first provides a LCoS panel including a plurality of pixel units B1. FIG. 1 is a planar view of a LCoS panel 10 in a first embodiment of the present disclosure. FIG. 2 is a cross-sectional view of the LCoS panel 10 of FIG. 1 taken along line A-A'. As shown in FIG. 1 and FIG. 2, the LCoS panel 10 of this embodiment includes a CMOS substrate 110, a liquid crystal layer 120, a conductive glass film 130, and a cover plate 140 stacked in the order written, the CMOS substrate 110 is integrated with a display control circuit 150.

The conductive glass film 130 may be an indium tin oxide (ITO) layer or the like.

In one embodiment, a method for making the LCoS panel 10 includes: forming the display control circuit 150 on a silicon wafer by depositing and etching a plurality of dielectric layers and metal layers, wherein the topmost metal layer includes a plurality of aluminum electrodes as a plurality of reflective mirrors to form a CMOS active array substrate (the CMOS substrate 110; then bonding the CMOS substrate 110 with the cover plate 140 (which may be glass) fixed with the conductive glass film 130; and injecting liquid crystal to form the liquid crystal layer 120 between the CMOS substrate 110 and the conductive glass film 130, to complete the LCoS panel 10. In other embodiments, the liquid crystal may be deposited first, and then the cover plate 140 is fixed to the CMOS substrate 110.

The LCoS panel 10 further includes a rubber frame 160 between the conductive glass film 130 and the CMOS substrate 110. The rubber frame 160 is arranged in a peripheral area of the liquid crystal layer 120. The rubber frame 160 is used for supporting the conductive glass film 130, area separation, and packaging the liquid crystal layer 120.

The LCoS panel 10 is divided into a pixel area B, a dam area C at a periphery of the pixel area B, and other area (not shown) at a periphery of the dam area. The pixel area B is provided with a plurality of pixel units B1. The liquid crystal layer 120 corresponds to the pixel area B, and the rubber frame 160 corresponds to the dam area C.

The display control circuit 150 of this embodiment includes a driving circuit 151 and a pixel memory array circuit 152 including a plurality of pixel memory units 1521, each pixel memory unit 1521 corresponds to one pixel unit B1. The pixel memory unit 1521 can be a Pixel storage capacitance. A projection of the pixel memory array circuit 152 on the CMOS substrate 110 is within a range of a projection of the pixel units B1 on the CMOS substrate 110. The driving circuit 151 (which includes at least one row driving circuit and at least one column driving circuit) is electrically connected to the pixel memory array circuit 152. A projection of the driving circuit 151 on the CMOS substrate 110 is outside the range of the projection of the pixel units B1 on the CMOS substrate 110. The driving circuit 151 provides modulation signals for modulating pixels and a plurality of pixel data. The pixel memory array circuit 152 modulates the pixel data according to the modulation signals to provide a plurality of pixel display voltages for the pixel units B1.

Specifically, an area where all pixel units B1 of the LCoS panel 10 are located is the pixel area B. The projection of the driving circuit 151 on the CMOS substrate 110 is outside the range of the projection of the pixel area B on the CMOS substrate 110. Specifically, the projection of the driving circuit 151 on the CMOS substrate 110 may be within a range of a projection of the dam area C on the CMOS substrate 110 and/or the other area, and the projection of the driving circuit 151 lays outside of at least two sides of the projection of the pixel area B on the CMOS substrate 110.

In the LCoS panel 10, a CMOS array on a monocrystalline silicon substrate replaces a traditional thin-film transistor (TFT) array. Specifically, the driving circuit 151 (including CMOS) and the pixel memory array circuit 152 (including CMOS) are integrated on the monocrystalline silicon substrate, a drain electrode is electrically connected to a pixel electrode through a through hole, and the pixel electrode is made of aluminum as a reflecting electrode. In order to prevent strong light from irradiating a channel, a metal light blocking layer (not shown) can be added on the CMOS substrate 110. Alternatively, an orientation film can also be added to an upper side and a lower side of the liquid crystal layer 120.

The pixel memory array circuit 152 of this embodiment is a static random-access memory (SRAM). In other embodiments, the pixel memory array circuit 152 can also be a dynamic random-access memory (DRAM).

A specific structure and working principle of the display control circuit 150 are described in detail below.

Different from the prior art, in this embodiment, the projection of the driving circuit 151 on the CMOS substrate 110 is outside the range of the projection of the pixel units B1 on the CMOS substrate 110. That is, the driving circuit 151 is within the periphery of the pixel units B1, which can reduce a volume of the driving circuit 151, reduce an area of the pixel units B1, reduce a size of the LCoS panel 10, and increase an output of the LCoS panel 10 of a single wafer or improve a resolution of the LCoS panel 10 when the wafers have a same size. Besides, since the dam area C (where the rubber frame 160 is located) surrounds the pixel area B where the pixel units B1 locate, the driving circuit 151 being located outside of at least two sides of the pixel area B can make full use of the dam area C, reducing the size of the LCoS panel 10, and improving the output of the LCoS panel 10 of a single wafer.

Figure 3:
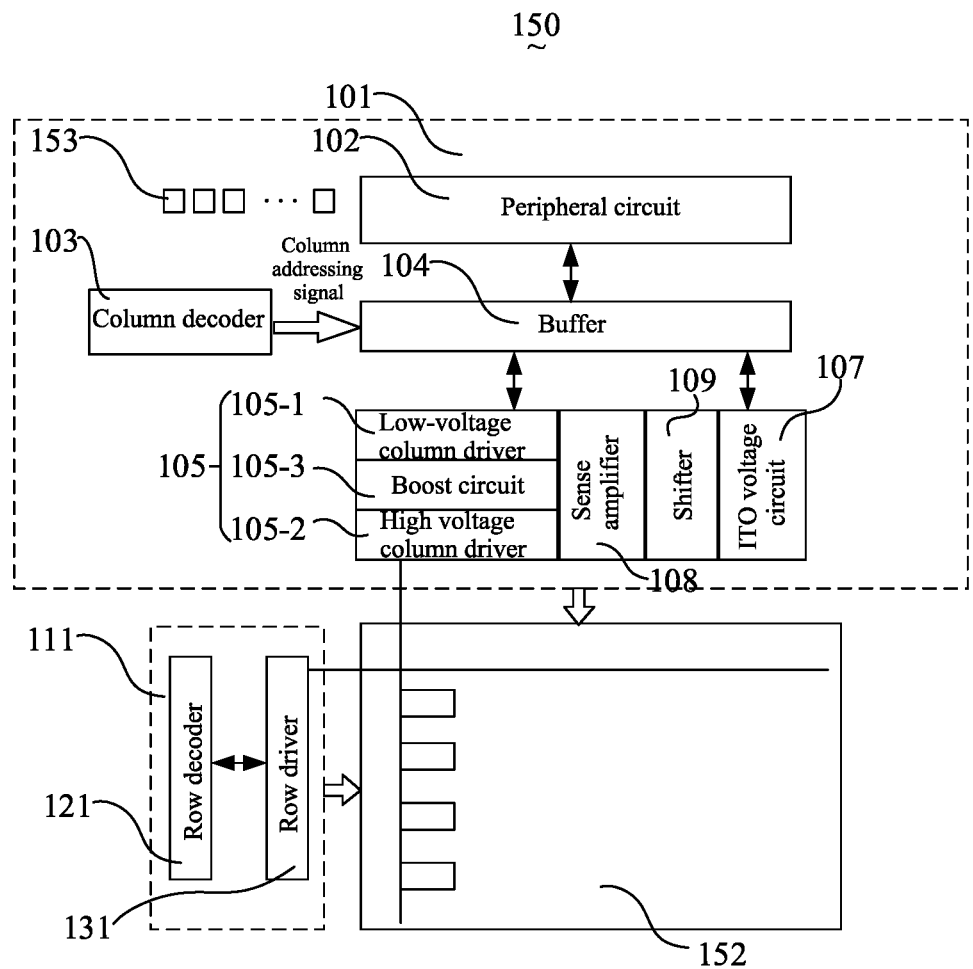
FIG. 3 is a schematic diagram of a display control circuit in a first embodiment of the present disclosure.

The present disclosure further provides the display control circuit 150 installed in the above described LCoS panel 10. FIG. 3 is a schematic diagram of the display control circuit 150 of the present disclosure. As shown in FIG. 3, the display control circuit 150 of this embodiment includes the driving circuit 151 (not shown) and the pixel memory array circuit 152, the pixel memory array circuit 152 includes a plurality of pixel memory units 1521, each pixel memory unit 1521 corresponds to one pixel unit B1. The projection of the pixel memory array circuit 152 on the CMOS substrate 110 is within the range of the projection of the pixel units B1 on the CMOS substrate 110. The driving circuit 151 is electrically connected to the pixel memory array circuit 152, and the projection of the driving circuit 151 on the CMOS substrate 110 is outside the range of the projection of the pixel units B1 on the CMOS substrate 110. The driving circuit 151 is used to provide the modulation signals and the pixel data. The pixel memory array circuit 152 modulates the pixel data according to the modulation signals to provide the display voltages for the pixel units B1.

Specifically, the area where all pixel units B1 of the LCoS panel 10 are located is the pixel area B in FIG. 1 and FIG. 2. The projection of the driving circuit 151 on the CMOS substrate 110 is outside the range of the projection of the pixel area B on the CMOS substrate 110, and specifically can be outside the range of the projection of the dam area C on the CMOS substrate 110.

The pixel area B of this embodiment is provided with a pixel array B2 including a plurality of the pixel units B1. The pixel memory array circuit 152 of this embodiment are composed of a plurality of SRAM memory units 1522, wherein the pixel units B1 have a one-to-one correspondence with the SRAM memory units 1522. The pixel data are modulated by writing the modulation signals varying in time period to the SRAM memory units 1522 by the driving circuit 151, which can generate the required display voltages of the pixel units B1.

Differing from the prior art, in this embodiment, the projection of the driving circuit 151 on the CMOS substrate 110 is outside the pixel area B, specifically within the range of the projection of the dam area C on the CMOS substrate 110. That is, the driving circuit 151 arranged in the dam area C can reduce the volume of the driving circuit 151 in the pixel area B, reduce the area of the pixel units B1, reduce the size of the LCoS panel 10, and improve the output of the LCoS panel 10 of a single wafer.

Alternatively, the projection of the driving circuit 151 on the CMOS substrate 110 is outside of at least two sides of the projection of the pixel area B on the CMOS substrate 110. Since the dam area C (where the rubber frame 160 is located) surrounds the pixel area B, the driving circuit 151 is outside of at least two sides of the pixel area B and arranged on the dam area C, which can make full use of the dam area C, reduce the size of the LCoS panel 10, and improve the output of the LCoS panel 10 of a single wafer.

Alternatively, the pixel area B of the pixel units B1 can be divided into a display pixel area and an alignment pixel area surrounding the display pixel area. The pixel memory array circuit 152 provides the pixel display voltages for the pixel units B1 of the display pixel area and provides preset pixel voltages for the pixel units B1 of the alignment pixel area.

Due to an error in the manufacturing process, a part of the pixel units B1 may be improperly covered when encapsulating the LCoS panel 10. Since the alignment pixel area surrounds the display pixel area, pixel units B1 in the alignment pixel area surround pixel units B1 in the display pixel area. Therefore, a part of the pixel units B1 in the alignment pixel area may be covered and in the dam area C, which avoids the pixel units B1 in the display pixel area being improperly covered. That is, the pixel units B1 in the alignment pixel area are not used to display but are reserved to avoid the pixel units B1 in the display pixel area being covered.

Since the part of the pixel units B1 in the alignment pixel area are covered by liquid crystal, a problem of light incident on the pixel units B1 in the alignment pixel area remains. Therefore, a luminance information equivalent to 0 can be sent to the pixel units B1 in the alignment pixel area. That is, the pixel units B1 in the alignment pixel area are set as black. Moreover, the pixel units B1 in the alignment pixel area are not provided with any image data but only provided with high and low voltages (the preset voltage) according to a voltage conversion of the conductive glass film 130.

Alternatively, the driving circuit 151 of this embodiment includes a column driving circuit 101 including a peripheral circuit 102, a column decoder 103, a buffer 104, and a column driver 105. The peripheral circuit 102 provides the pixel data. The column decoder 103 accesses column addressing signals. The buffer 104 is electrically connected to the column decoder 103 and the peripheral circuit 102 to cache the pixel data and the column addressing signals. The column driver 105 is electrically connected to the buffer 104 and the pixel memory array circuit 152 to obtain the pixel data from the buffer 104. The pixel memory array circuit 152 obtains the pixel data and the column addressing signals from the column driver 105.

The peripheral circuit 102 of this embodiment includes at least a peripheral logic circuit (not shown), a timing control circuit (not shown), an instruction decoder (not shown), a data control circuit (not shown), and a mode control circuit (not shown in the figures). Besides a function of providing the pixel data, the peripheral circuit 102 is further configured to provide logic signals such as timing control signals, data control signals, and mode control signals. The peripheral circuit 102 caches the pixel data of a current frame and controls information from the peripheral logic circuit, the timing control circuit, the instruction decoder, the data control circuit, and the mode control circuit in the buffer 104. The column decoder 103 caches the column addressing signals accessed in the buffer 104, so that the pixel memory array circuit 152 reads and writes the pixel data according to the column addressing signals.

Each of the column addressing signals is binary data "1 or 0". When the column addressing signals of one or more columns of SRAM memory units 1522 are "1", the SRAM memory units 1522 can read and write pixel data. When the column addressing signals of one or more columns of SRAM memory units 1522 are "0", the SRAM memory units 1522 cannot read and write pixel data.

In this embodiment, a reading time and a writing time of the SRAM memory units 1522 in a period (a frame period) are controlled according to the column addressing signals to obtain values of the pixel display voltages (that is, grayscale levels) of each pixel unit.

Alternatively, in this embodiment, the buffer 104 operates in a low-voltage section (such as 1.5-1.8V), while the pixel memory array circuit 152 operates in a high-voltage section (about 5V), the high-voltage section is higher than the low-voltage section. In this embodiment, the column driver 105 further includes a low-voltage column driver 105-1, a high-voltage column driver 105-2, and a boost circuit 105-3. The low-voltage column driver 105-1 is used to drive low-voltage pixel data (that is, the pixel data in the low-voltage section) from the buffer 104. The boost circuit 105-3 is electrically connected to the low-voltage column driver 105-1 and the high-voltage column driver 105-2, and is used to boost and convert the low-voltage pixel data from the low-voltage column driver 105-1 into high-voltage pixel data, to supply the high-voltage pixel data to the high-voltage column driver 105-2. The high-voltage column driver 105-2 is used to drive the high-voltage pixel data and output the high-voltage pixel data to the pixel memory array circuit 152.

On one hand, the boost circuit 105-3 can reduce a working voltage of the pixel data provided by the peripheral circuit 102 and improve a transmission rate of the pixel data because a transmission rate of a low voltage signal is faster. On the other hand, the boost circuit 105-3 avoids a short circuit problem caused by a transistor of a low operating-voltage without voltage conversion being close to a transistor of a high operating-voltage of the pixel memory array circuit of the pixel units B1. Besides, the boost circuit 105-3 is outside the pixel area B, which can reduce the area of the pixel units B1.

In this embodiment, the pixel data and the modulation signals of the pixel memory array circuit 152 can be written through the peripheral circuit 102, the column decoder 103, the buffer 104, and the column driver 105.

Alternatively, the column driving circuit 101 of this embodiment further includes an ITO voltage circuit 107 electrically connected to the buffer 104 and the pixel memory array circuit 152 (this may be through the column driver 105) to provide ITO voltages for logical conversion of display pixel data and conversion of alignment pixel data to convert the polarity of the pixel data. The ITO voltages and the pixel data provide a bias for the pixel units B1 and maintain a DC balance.

Alternatively, the column driving circuit 101 of this embodiment further includes a sense amplifier 108 and a shifter 109. The sense amplifier 108 is electrically connected to the column driver 105 for amplifying the pixel data, and the shifter 109 is electrically connected to the sense amplifier 108 and the buffer 104 (which may be connected through the column driver 105) for shifting and outputting the pixel data to the pixel memory array circuit 152 after amplification processing.

In some display scenes, a display process needs to be monitored, the pixel data needs to be read out and the pixel units B1 need to be monitored according to the pixel data. The peripheral circuit 102 obtains the pixel data from the buffer 104 and transmits the pixel data to a controller (not shown) of the LCoS panel 10 to monitor the display process of the LCoS panel 10.

In this embodiment, the pixel data of the pixel memory array circuit 152 can be read and monitored through the sense amplifier 108, the shifter 109, the peripheral circuit 102, etc.

Alternatively, the driving circuit 151 of the present embodiment further includes a row driving circuit 111 including a row decoder 121 and a row driver 131. The row decoder 121 is used to access row addressing signals. The row driver 131 is electrically connected to the row decoder 121 and the pixel memory array circuit 152. The row driver 131 is used to control the pixel memory array circuit 152 to read and write pixel data according to the row addressing signals.

The pixel memory array circuit 152 of this embodiment is a SRAM composed of a plurality of transistors, each pixel unit B1 corresponds to one SRAM. One row of SRAM is periodically gated (that is, one row of pixel units B1 is driven) through the row addressing signals, and the modulation signals and pixel data are sent to the SRAM gated in each column through the column driving circuit 101 to drive the pixel units B1 to work.

Figure 6:
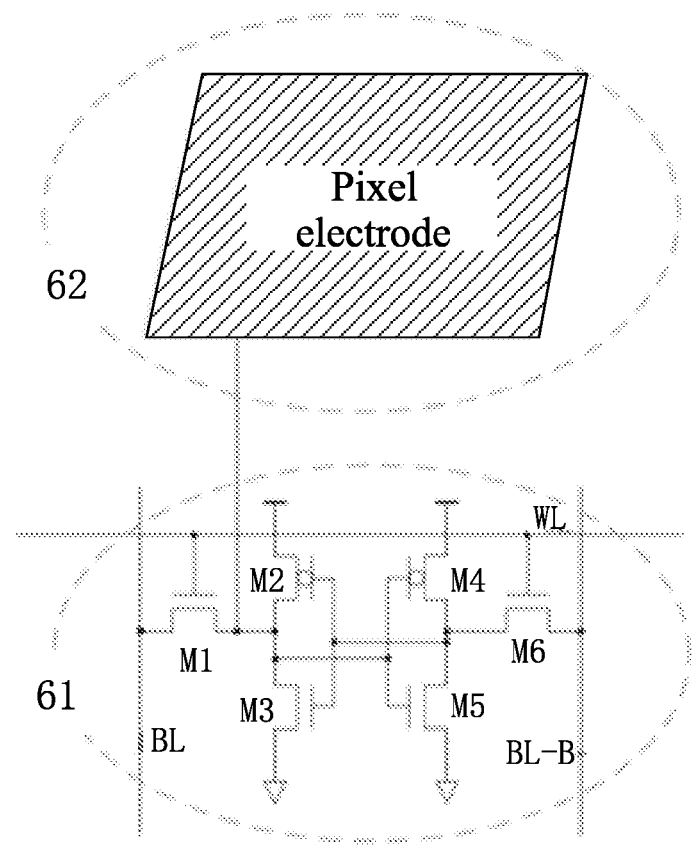
FIG. 6 shows a pixel memory array circuit in the display control circuit of the present disclosure.

Alternatively, only SRAM array is in the pixel area B, other driving circuits of the pixel units B1 are in the dam area C, and one pixel unit B1 corresponds to one SRAM. As shown in FIG. 6, a SRAM memory 61 includes six transistors M1-M6, the SRAM memory 61 is at the bottom of a pixel electrode 62, and the other driving circuits are at the bottom of the rubber frame 160. A control end of the transistor M1 is electrically connected to the row driving circuit 111, and a drain is electrically connected to the column driving circuit 101. A control end of the transistor M2 is electrically connected to a control end of the transistor M3, a source end of the transistor M2 is configured to receive a voltage, and a drain end of the transistor M2 is electrically connected to a source of the transistor M1 and a drain of the transistor M3. A source of the transistor M3 is grounded. A control end of the transistor M4 is electrically connected to a control end of the transistor M5, a source end of the transistor M4 is configured to receive a voltage. Drains of the transistor M4, the transistor M6, and the transistor M5 are electrically connected to the pixel electrode 62. A source end of the transistor M5 is grounded. A control end of the transistor M6 is electrically connected to the row driving circuit 111 and the column driving circuit.

Further, the driving circuit 151 of this embodiment further includes an input/output pad 153, the peripheral circuit 102 is electrically connected to the controller or other circuits through the input/output pad 153.

The projections of the row driving circuit 111 and the column driving circuit 101 on the CMOS substrate 110 of this embodiment are at the periphery of the projection of the pixel area B on the CMOS substrate 110.

Alternatively, the display control circuit 150 of this embodiment is provided with only one row driving circuit 111 and one column driving circuit 101.

Figure 4A:
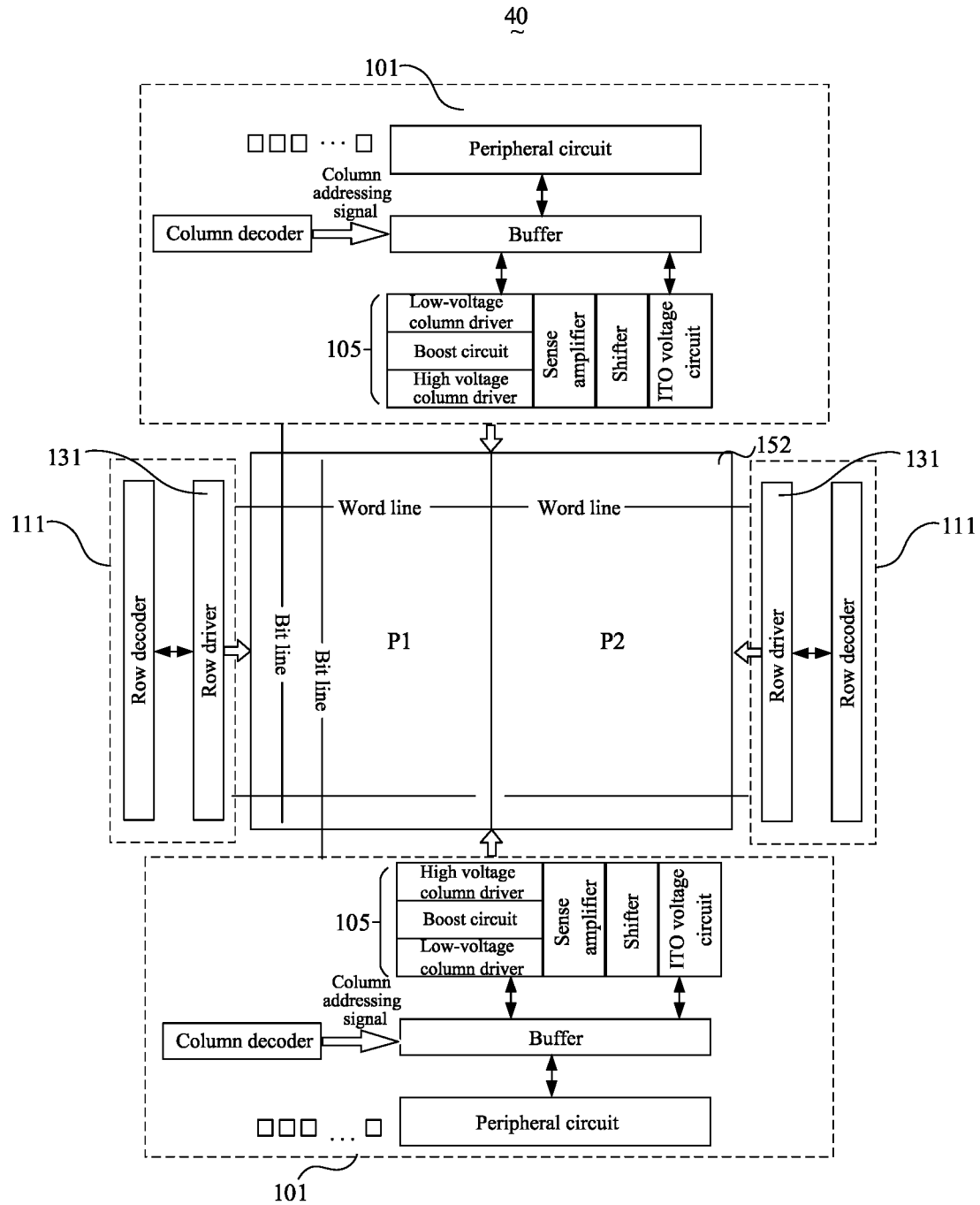
FIG. 4A is a schematic diagram of a display control circuit in a second embodiment of the present disclosure.

FIG. 4A is a schematic diagram of a display control circuit 40 in a second embodiment of the present disclosure. In the second embodiment, as shown in FIG. 4A, a difference of the display control circuit 40 of this embodiment from the display control circuit 150 above is that a plurality of pixel units B1 form at least two sub-pixel arrays (P1 and P2), the display control circuit 40 includes at least two row driving circuits 111 and at least two row drivers 131, each row driver 131 corresponds to one sub-pixel array, each pixel memory unit 1512 and one row driver 131 corresponding to a same sub-pixel array are electrically connected by a wire (not shown), and wires of the row drivers 131 are electrically insulated from each other.

Specifically, in this embodiment, two row drivers 131 are arranged on two opposite sides of the pixel array B2 (composed of all pixel units B1). The two row drivers 131 are electrically connected to different sections of a same word line in each row of the pixel array B2. As shown in FIG. 4A, the row driver 131 on the left is electrically connected to a left half of the word line, the row driver 131 on the right is electrically connected to a right half of the word line, the two halves of the word line are not connected to each other, which makes it possible to start reading and writing data at two positions in a same row of the pixel array B2 at the same time according to one of row driving signals. For example, if 1920 pixels are in a same row, the row driver 131 on the left starts reading and writing from a first pixel, the row driver 131 on the right starts reading and writing from the 961st pixel, and the reading and writing of the two positions can be carried out at the same time.

In this embodiment, the at least two sub-pixel arrays P1 and P2 (corresponding to the pixel memory array circuit 152) are controlled by the at least two row drivers 131 respectively, so that the at least two sub-pixel arrays P1 and P2 (corresponding to the pixel memory array circuit 152) can be independently and synchronously controlled. Therefore, the at least two rows of pixel memory array circuits 152 can read and write pixel data synchronously, and a reading speed and a writing speed of the pixel data of the whole display control circuit 40 can be at least doubled.

For pixel units B1 in a same row, the pixel data can also be read and written in other order, the order is not limited. For example, the row driver 131 on the right can read and write from the 1920th pixel in a reverse order.

Alternatively, the display control circuit 40 of this embodiment includes two column driving circuits 101, each column driving circuit 101 includes a column driver 105. As shown in FIG. 4A, each column driver 105 is electrically connected to the sub-pixel arrays P1 and P2. The column driver 105 above the pixel array B2 is electrically connected to odd columns of the pixel array B2, and the column driver 105 below the pixel array B2 is electrically connected to even columns of the pixel array B2, which avoids bit lines being over-dense on one side of the pixel array B2 and is conducive to a circuit layout. In other embodiments, the number of the column driving circuits 101 is not limited.

The column drivers 105, the row driver 131, and the sub-pixel arrays P1 and P2 of this embodiment correspond in a one-by-one manner. The two column drivers 105 are on the upper side and the lower side of the pixel area B, respectively, and the two row drivers 131 are on the left side and the right side of the pixel area B, respectively, which can make full use of the dam area C and increase a display area.

Figure 4B:
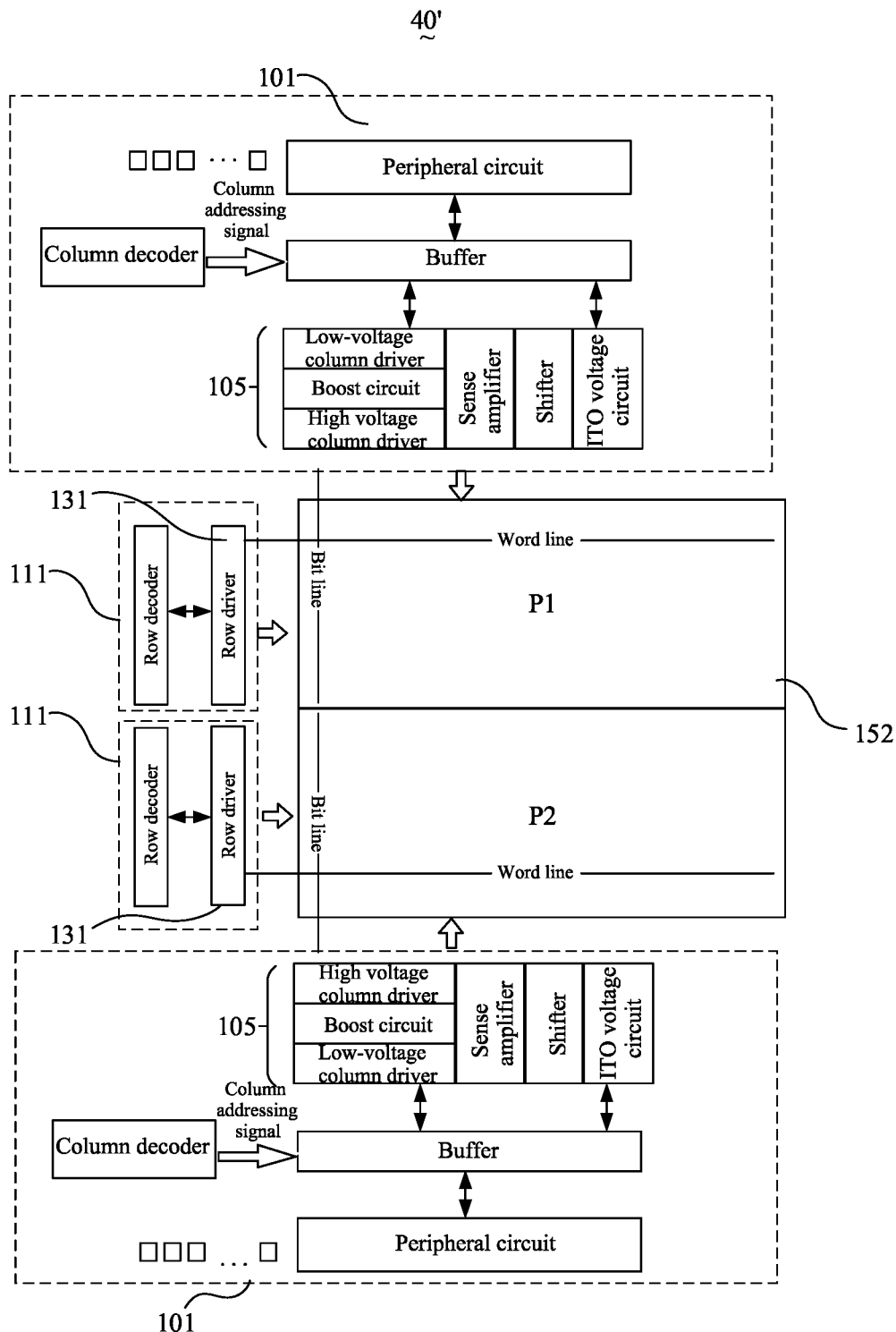
FIG. 4B is a schematic diagram of the display control circuit in FIG. 4A in another embodiment.

FIG. 4B is a schematic diagram of a display control circuit 40' in a modified embodiment of the display control circuit 40 in FIG. 4A. As shown in FIG. 4B, the plurality of pixel units B1 form at least two sub-pixel arrays (P1 and P2), the display control circuit 40' of this embodiment includes two column driving circuits 101, and each column driver 105 of the column driving circuit 101 corresponds to one sub-pixel array (P1 or P2). Each pixel memory unit 1521 and one column driver 105 corresponding to a same sub-pixel array are electrically connected by a wire (not shown), and wires of the column drivers 105 are electrically insulated from each other.

Specifically, in the modified embodiment of FIG. 4B, the two column drivers 105 are on the upper side and the lower side of the pixel array B2 (composed of all pixel units B1), respectively. For each bit line in a column of the pixel array B2, the two column drivers 105 are electrically connected to different sections of the bit line. As shown in FIG. 4B, for a same column, the column driver 105 on the upper side is electrically connected to an upper half of the bit line, the column driver 105 on the lower side is electrically connected to a lower half of the bit line, and the two halves of the bit line are not electrically connected to each other, thus making it possible to start data reading and writing at two positions in one column of the pixel array B2 at the same time under one of column driving signals. For example, if 1080 pixels are comprised in each column, the column driver 105 on the upper side reads and writes from the first pixel, and the column driver 105 on the lower side reads and writes from the 541st pixel (or reads and writes from the 1080th pixel in a reverse order, not limited) and the reading and writing of the two positions can be carried out at the same time.

In the embodiment of FIG. 4B, the display control circuit 40' includes two row driving circuits 111, each row driving circuit 111 includes a row driver 131. With a switching of each row by two column drivers 105, two row drivers 131 read and write a whole row corresponding to the two sub-pixel areas P1 and P2 respectively (rather than reading and writing the half row as shown in FIG. 4A). In this embodiment, a division of the pixel array B2 mainly depends on a division of the bit line by the column driver 105, and the two row driving circuits 111 of this embodiment can also be replaced by one larger row driving circuit.

In other embodiments other than that shown in FIG. 4A and FIG. 4B, a plurality of column driving circuits and a plurality of row driving circuits may be provided, the numbers of column and row driving circuits are not limited.

The sub-pixel arrays are driven by different column driving circuits and different row driving circuits in this embodiment, which can avoid leakage and large power consumption. Especially, each word line is divided into parts that are not electrically connected to each other and/or each bit line is divided into portions that are not electrically connected to each other, which avoids leakage and heavy power consumption.

Figure 5:
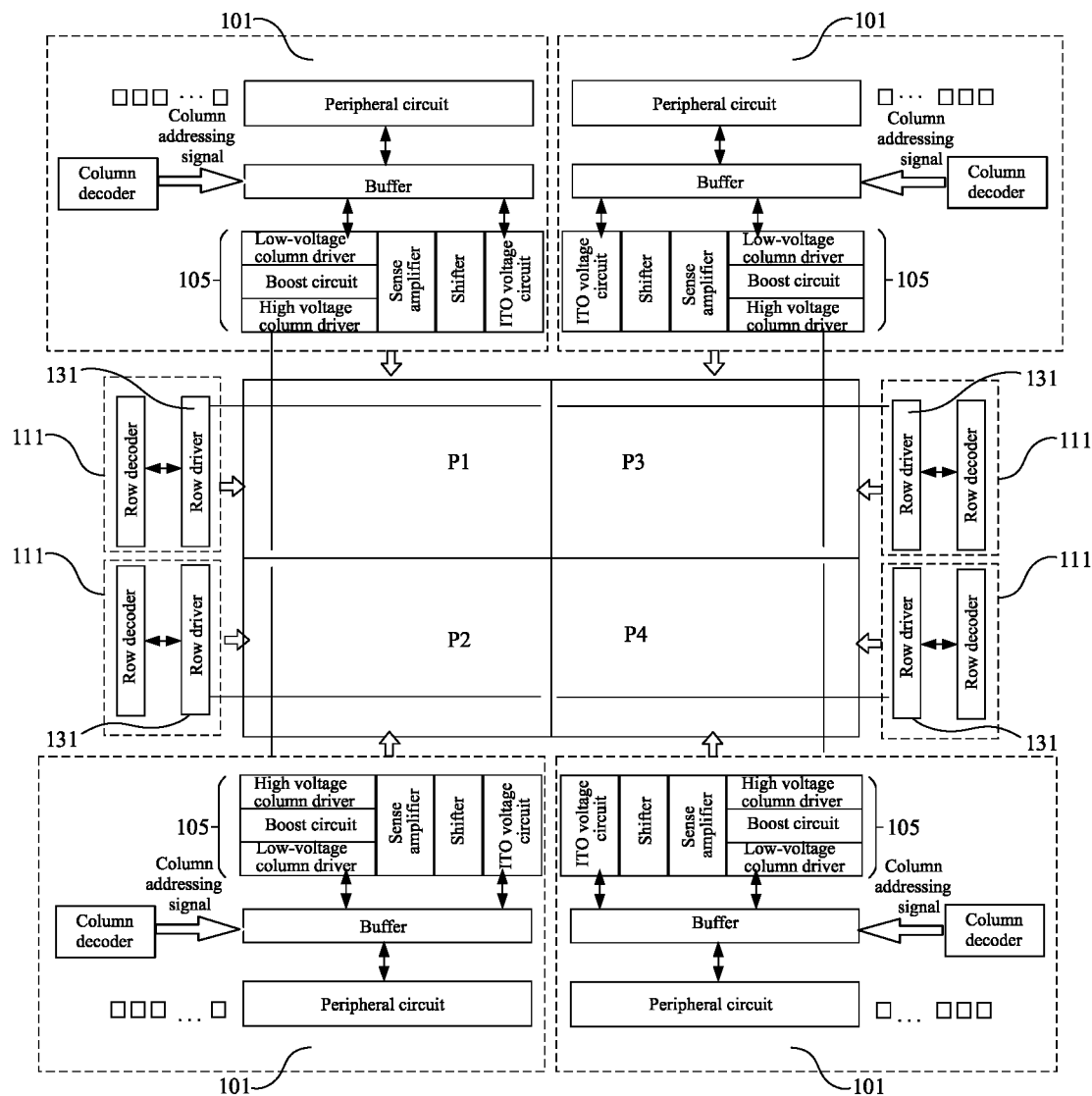
FIG. 5 is a schematic diagram of a display control circuit in a third embodiment of the present disclosure.

A third embodiment of the present disclosure further provides a display control circuit. FIG. 5 is a schematic diagram of a display control circuit 50 in the third embodiment of the present disclosure. As shown in FIG. 5, differences between the display control circuit 50 and the display control circuit 150 described above is that the pixel units B1 form M*N sub-pixel arrays. That is, the pixel array B2 is divided into M*N parts. The driving circuit 151 includes M*N column driving circuits 101, M*N row driving circuits 111, M*N column drivers 105, and M*N row drivers 131. Each column driver 105 corresponds to one sub-pixel array, and each row driver 131 corresponds to one sub-pixel array. Each pixel memory unit 1521 and one column driver 105 corresponding to a same sub-pixel array are electrically connected through a wire, wires of the column drivers 105 are electrically isolated. Each pixel memory unit 1521 and one row driver 131 corresponding to a same sub-pixel array are electrically connected through wires, wires of the row driver 131 are electrically isolated. Specifically, each bit line and/or each word line are divided into portions which are electrically isolated.

M is a natural number greater than 1 and N is a natural number greater than 1. Specifically, M is 2 and N is 2 in this embodiment. In other embodiments, M and N may be set according to actual needs.

In the embodiment shown in FIG. 5, the pixel array B2 is divided into 2*2 parts and includes sub-pixel arrays P1, P2, P3, and P4. That is, M=2, N=2.

In this embodiment of the present disclosure, the modulation signals are written into each sub-pixel array in multiple rows, a quarter of the sub-pixel array, a half of the sub-pixel array, or a whole sub-pixel array.

In FIG. 5, the four column driving circuits 101 include four peripheral circuits, four buffers, four column decoders, etc. In fact, the four peripheral circuits, four buffers, and four column decoders are divided because there are four separate column driving circuits 101. In other embodiments, the four peripheral circuits may be integrated into one peripheral circuit, the four buffers may be integrated into one buffer, and the four column decoders may be integrated into one column decoder.

The display control circuit of the present disclosure described above can be used not only for the LCoS panel, but also for other display panels such as liquid crystal display (LCD), digital micromirror devices (DMD), Micro light-emitting diode (Micro-LED) display, or mini light-emitting diode (Mini-LED) display, not being limited.

Ordinary technicians in the technical field should realize that the above embodiments are only used to illustrate the present disclosure and not to limit the present disclosure. Appropriate changes made to the above embodiments fall within a protection scope of the present disclosure as long as the changes are within a substantive spirit of the present disclosure.

What is claimed is:

1. A display control circuit, applying to a display panel comprising a plurality of pixel units and a substrate, the display control circuit comprising:
 a pixel memory array circuit comprising a plurality of pixel memory units, the plurality of pixel units and the plurality of pixel memory units have a same number, a position of each of the plurality of pixel memory units corresponding to a position of one of the plurality of pixel units, a projection of the pixel memory array circuit on the substrate being within a projection of the plurality of pixel units on the substrate; and
 a driving circuit comprising a row driving circuit and a column driving circuit, the driving circuit being electrically connected to the pixel memory array circuit, a projection of the driving circuit on the substrate being outside the projection of the plurality of pixel units on the substrate, the driving circuit being configured to provide modulation signals and pixel data;
 wherein the pixel memory array circuit is configured to modulate the pixel data according to the modulation signals to provide pixel display voltages to the plurality of pixel units.

2. The display control circuit of claim 1, wherein the plurality of pixel units comprises a display pixel area and an alignment pixel area surrounding the display pixel area; and
 the pixel memory array circuit is configured to provide the pixel display voltages to each pixel unit in the display pixel area and provide a preset pixel voltage to each pixel unit in the alignment pixel area.

3. The display control circuit of any one of claim 1, wherein a projection of the at least one row driving circuit on the substrate and a projection of the at least one column driving circuit on the substrate are at a periphery of the projection of the plurality of pixel units on the substrate.

4. A liquid crystal on silicon panel comprising a CMOS substrate, a liquid crystal layer, a conductive glass film, and a cover plate stacked in sequence, the CMOS substrate being integrated with a display control circuit applying to a display panel comprising a plurality of pixel units and a substrate, the display control circuit comprising:
 a pixel memory array circuit comprising a plurality of pixel memory units, the plurality of pixel units and the plurality of pixel memory units have a same number, a position of each of the plurality of pixel memory units corresponding to a position of one of the plurality of pixel units, a projection of the pixel memory array circuit on the substrate being within a projection of the plurality of pixel units on the substrate; and
 a driving circuit comprising a row driving circuit and a column driving circuit, the driving circuit being electrically connected to the pixel memory array circuit, a projection of the driving circuit on the substrate being outside the projection of the plurality of pixel units on the substrate, the driving circuit being configured to provide modulation signals and pixel data;
 wherein the pixel memory array circuit is configured to modulate the pixel data according to the modulation signals to provide pixel display voltages to the plurality of pixel units.

5. The liquid crystal on silicon panel of claim 4, further comprises a rubber frame between the conductive glass film and the CMOS substrate;
 wherein the rubber frame is in a peripheral area of the liquid crystal layer, and at least a portion of the projection of the driving circuit on the substrate is within a projection of the rubber frame on the substrate.

6. A display control circuit, applying to a display panel comprising a plurality of pixel units and a substrate, the display control circuit comprising:
 a pixel memory array circuit comprising a plurality of pixel memory units, the plurality of pixel units and the plurality of pixel memory units have a same number, a position of each of the plurality of pixel memory units corresponding to a position of one of the plurality of pixel units, a projection of the pixel memory array circuit on the substrate being within a projection of the plurality of pixel units on the substrate; and a driving circuit comprising a row driving circuit and a column driving circuit, the driving circuit being electrically connected to the pixel memory array circuit, a projection of the driving circuit on the substrate being outside the projection of the plurality of pixel units on the substrate, the driving circuit being configured to provide modulation signals and pixel data, the column driving circuit comprising:

a peripheral circuit being configured to provide the pixel data;

a column decoder being configured to access a column addressing signal;

a buffer electrically connected to both the column decoder and the peripheral circuit, the buffer being configured to cache the pixel data and the column addressing signal; and a column driver electrically connected to both the buffer and the pixel memory array circuit, the column driver being configured to obtain the pixel data from the buffer;

wherein the pixel memory array circuit is configured to modulate the pixel data according to the modulation signals to provide pixel display voltages to the plurality of pixel units.

7. The display control circuit of claim 6, wherein the column driver comprises:

a low-voltage column driver for driving low-voltage pixel data from the buffer;

a high-voltage column driver for driving high-voltage pixel data and outputting the high-voltage pixel data to the pixel memory array circuit; and a boost circuit being electrically connected to both the low-voltage column driver and the high-voltage column driver, the boost circuit being configured to boost and convert the low-voltage pixel data into the high-voltage pixel data to provide the high-voltage pixel data to the high-voltage column driver.

8. The display control circuit of claim 7, wherein the column driving circuit further comprises:

a sense amplifier electrically connected to the column driver for amplifying the pixel data;

a shifter electrically connected to both the sense amplifier and the buffer, the shifter being configured for shifting and outputting the pixel data amplified to the pixel memory array circuit; and an ITO voltage circuit electrically connected to both the buffer and the pixel memory array circuit, the ITO voltage circuit being configured to provide an ITO voltage for converting a polarity of the pixel data.

9. The display control circuit of claim 6, wherein the plurality of pixel units forms at least two sub-pixel arrays, the display control circuit comprises at least two column drivers, each of the at least two column drivers corresponds to one of the at least two sub-pixel arrays, each of the plurality of pixel memory units and one of the at least two column drivers corresponding to a same sub-pixel array are electrically connected to each other by a wire, and the wire of one of the at least two column drivers is electrically insulated from that of another of the at least two column drivers.

10. The display control circuit of claim 6, wherein the at least one row driving circuit comprises:

a row decoder for accessing a row addressing signal; and a row driver electrically connected to both the row decoder and the pixel memory array circuit, the row driver being configured to control the pixel memory array circuit to read and write the pixel data according to the row addressing signal.

11. The display control circuit of claim 10, wherein the plurality of pixel units forms at least two sub-pixel arrays, the display control circuit comprises at least two row drivers, each of the at least two row drivers corresponds to one of the at least two sub-pixel arrays, each of the plurality of pixel memory units and one of the at least two row drivers corresponding to a same sub-pixel array are electrically connected to each other by a wire, and the wire of one of the at least two row drivers is electrically insulated from that of another of the at least two row drivers.

12. The display control circuit of claim 10, wherein the plurality of pixel units forms M*N sub-pixel arrays, the driving circuit includes M*N column drivers and M*N row drivers, each of the M*N column drivers corresponds to one of the M*N sub-pixel arrays, each of the M*N row drivers corresponds to one of the M*N sub-pixel arrays;

each of the plurality of pixel memory units and one of the M*N column drivers corresponding to a same sub-pixel array are electrically connected by a wire of the one of the M*N column drivers, and wires of the M*N column drivers are electrically insulated from each other, each of the plurality of pixel memory units and one of the M*N row drivers corresponding to a same sub-pixel array are electrically connected to each other by a wire, and the wire of one of the M*N row drivers is electrically insulated from that of the other of the M*N row drivers;

where M is a natural number greater than 1, and N is a natural number greater than 1.

13. The display control circuit of claim 12, wherein the driving circuit reads and writes the plurality of pixel memory units corresponding to the M*N sub-pixel arrays simultaneously.

14. The display control circuit of claim 12, wherein a word line in each row of the pixel memory array circuit is divided into a plurality of parts unconnected to each other, and/or a bit line in each column of the pixel memory array circuit is divided into a plurality of portions unconnected to each other.

* * * * *